Oct. 19, 1965    G. DAVIS    3,212,356

TRANSMISSION

Filed March 27, 1961    2 Sheets-Sheet 1

INVENTOR.
GEORGE DAVIS
BY *M. A. Hobbs*

ATTORNEY

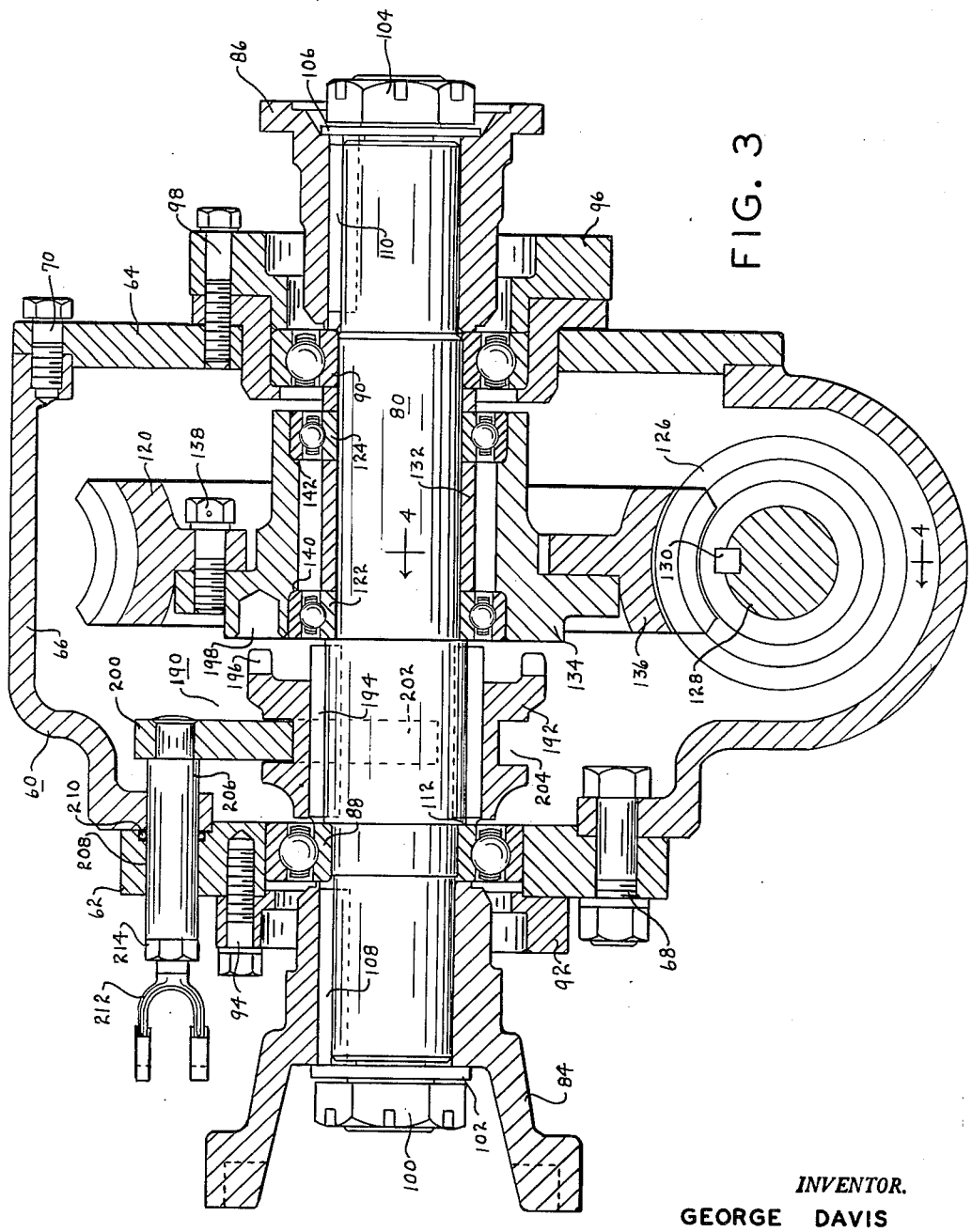

United States Patent Office 3,212,356
Patented Oct. 19, 1965

3,212,356
TRANSMISSION
George Davis, Dowagiac, Mich., assignor, by mesne assignments, to Link Belt Company, a corporation of Illinois
Filed Mar. 27, 1961, Ser. No. 98,421
8 Claims. (Cl. 74—661)

The present invention relates to transmissions and more particularly to transmissions for vehicles such as road grading equipment, excavators, derricks and similar machinery.

Conventional derricks, road grading equipment and excavators are usually equipped with two motors, one for propelling the vehicle on which the boom or similar work performing mechanism is mounted and another for operating the boom, bucket and rotatable platform on which the boom is mounted. One set of controls for operating the vehicle is provided at the driver's seat or in the cab of the vehicle and another set on the platform for the boom. In some types of equipment the motor on the vehicle is the only one of the two motors which can be used to drive the vehicle, and in other types either motor can be used to propel the vehicle, two sets of controls being alternately used in either type to control the vehicle. The mechanisms for controlling the vehicle from the two positions and for driving the vehicle from either of the two motors are often complex and unreliable and are difficult to operate to shift from one motor to the other. It is therefore one of the principal objects of the present invention to provide a transmission for equipment of the aforesaid type which is relatively simple in construction and operation and which can effectively be driven by one motor without any interference from the other motor.

Another object of the invention is to provide a transmission and a power and control means therefor which can readily be adapted to various types and makes of vehicles without altering the construction and operation of the unit and without requiring any complicated connections or special drives for making the installation.

Still another object of the invention is to provide a relatively simple and versatile transmission for alternately connecting a driven mechanism with two separate power drive mechanisms, which can be easily controlled from a plurality of different stations using separate sets of controls.

A further object is to provide a transmission of the aforesaid type which can be easily installed in conventional vehicles without making any substantial changes or modifications in the structure of the vehicle and which can readily be incorporated in the vehicle at the manufacturing plant or after the vehicle has been delivered to the ultimate customer and/or user of the equipment.

Another object of the invention is to provide a compact, sturdy multiple transmission unit which can be fabricated using standard machine tool equipment, and installed, serviced and repaired without any special tools, equipment or special skills.

Additional objects and advantages of the invention will become apparent from the following description and accompanying drawings, wherein:

FIGURE 3 is a longitudinal, vertical cross-sectional view through the transmission shown in FIGURE 2;

Figure 1:
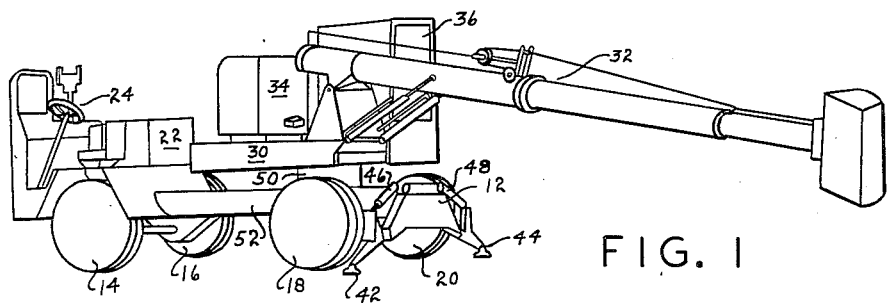
FIGURE 1 is a perspective view of an excavator having the present transmission incorporated therein.
Figure 2:
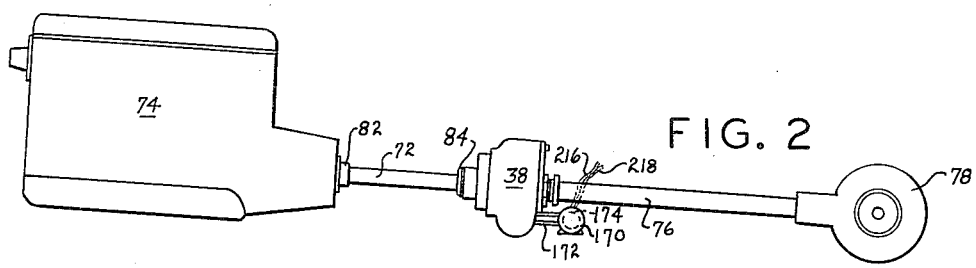
FIGURE 2 is a schematic diagram of one of the engines used in the excavator shown in FIGURE 1, a differential and my transmission showing the manner in which the transmission is incorporated in the excavator.

Referring more specifically to the drawings, FIGURE 1 illustrates one type of vehicle or mechanism on which the present transmission is adapted to operate, said vehicle briefly consisting of a truck 12 having wheels 14, 16, 18 and 20, an engine enclosed in hood 22, and a steering mechanism 24, and having pivotally mounted thereon a platform 30 for a boom 32 of an excavator, the platform and boom being operated by a separate engine in housing 34 and controlled from an operator's station 36 on the platform. The two engines are adapted to drive the vehicle individually through the present transmission shown at numeral 38 in FIGURE 2. The platform can be rotated three hundred and sixty degrees (360°) continuously on a pivot mechanism. The means of rotating the platform may consist of gears or any of several other types of drive mechanisms, although the present description is not concerned with any particular type, and the invention is not limited to any particular truck, engines, or work performing equipment mounted on the platform. The type of equipment shown in FIGURE 1 normally includes outriggers 42 and 44 operated by hydraulic cylinders 46 and 48 controlled by the operator from station 36. The pivot mechanism is secured to the underside of platform 30 and is mounted on a base 50 rigidly secured to frame 52 of vehicle 12.

The present transmission 38 is enclosed in a housing 60 having end plates 62 and 64 secured to the main body portion 66 of the housing 60 by bolts 68 and 70, respectively. The propeller shaft 72 from vehicle engine 74 is connected to the left-hand end of the transmission, and propeller shaft 76 is connected at one end with the right-hand end of the transmission, as viewed in FIGURE 2, and at the other end with the differential 78 of the vehicle. The engine 74, propeller shafts 72 and 76, and differential 78 are, for the purpose of the present invention, considered conventional and will not be described in detail herein. Propeller shafts 72 and 76 are connected through the transmission by a shaft 80 which, with the two propeller shafts, forms a direct drive between the engine 74 and differential 78. Propeller shaft 72 is connected to the engine and to shaft 80 by universal joints schematically shown at numerals 82 and 84, and shaft 76 is connected to the transmission by coupling 86 and to a driven gear in differential 78 in the conventional manner. Shaft 80 extends completely through housing 60 and is journaled in ball bearings 88 and 90 in end plates 62 and 64 of the housing, bearing 88 being retained by an annular bearing retaining member 92 secured to plate 62 by a plurality of bolts 94, and bearing 90 being seated in an annular retainer 96 secured to plate 64 by a plurality of bolts 98. One member of universal joint 84 is rigidly secured to the left hand end of shaft 80, as viewed in FIGURE 3, by a nut 100 threaded onto the end of shaft 80 and seating against washer 102, and coupling 86 is retained rigidly on the right hand end of shaft 80 by a nut 104 threaded onto the shaft and seating against washer 106. With this construction, the engine transmits the power therefrom through shafts 72, 80 and 76 to differential 78, universal joint part 84 being keyed rigidly to shaft 80 by a key 108, and coupling 86 being keyed to shaft 80 by key 110. Endwise movement of shaft 80 in the transmission housing is prevented by a shoulder 112 abutting bearing 88 on one side, and the inner end of universal joint part 84 abutting bearing 88 on the other side.

Figure 4:
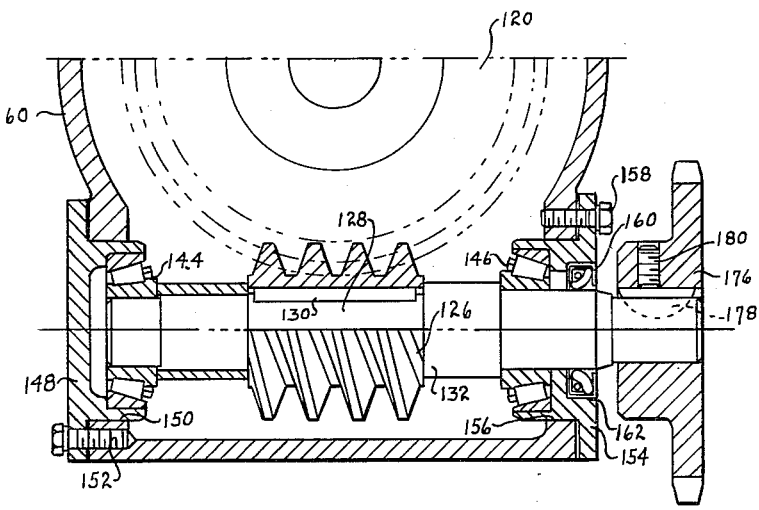
FIGURE 4 is a partial view of the transmission shown in vertical cross-section, taken on line 4—4 of FIGURE 3.

In order to drive the vehicle by the engine mounted on platform 30, the transmission includes a mechanism consisting of worm gear 120 journaled by ball bearings 122 and 124 on shaft 80 for free relative rotation thereon, and a worm 126 rigidly mounted on shaft 128 and keyed therewith by a key 130. Bearings 122 and 124 are held in spaced relation on shaft 80 by a spacer member 132 disposed between the two bearings, and worm gear 120, consisting of a hub portion 134 and a gear portion 136 joined together by a plurality of bolts 138, is prevented from moving axially on shaft 80 by spacer 132 and shoulders 140 and 142 on the inner surface of hub 134. Shaft 128 is journaled at one end in roller bearing 144 and at the other end in roller bearing 146, the former being supported in the transmission housing by an insert 148 which closes and seals an opening 150 in the lower portion of the housing and is held therein by a plurality of bolts 152, and the latter bearing being supported in an insert 154 seated in an opening 156 in the housing opposite opening 150 and retained therein in sealing relation by a plurality of bolts 158. Shaft 128 projects outwardly from the housing through insert 154 and is sealed by a gasket construction 160 seated in a recess 162 at the outer edge of insert 154. Shaft 128 and consequently worm 126 and worm gear 120 are driven by a hydraulic motor 170 through a chain 172 and sprockets 174 and 176 mounted on the hydraulic motor and the free end of shaft 128, respectively. As seen in FIGURE 4, sprocket 176 is held rigidly on shaft 128 for rotation therewith by a key 178 and set screw 180.

Worm gear 120 is operatively connected with shaft 80 by a clutch mechanism 190 consisting of a collar 192 slidable on shaft 80 and keyed therewith by a key 194, the collar having a plurality of fingers 196 for seating in a plurality of corrsponding recesses 198 of hub 134. When collar 192 is in its fully retracted position as shown in FIGURE 3, fingers 196 are fully removed from recesses 198. Likewise, when collar 192 is in its fully extended position, i.e. moved fully to the right as viewed in FIGURE 3, fingers 196 are seated fully in recesses 198, thus engaging the clutch with worm gear 120 and transmitting the rotative force of the gear to shaft 80.

Collar 192 is shifted between its unclutched position shown in FIGURE 3 to its fully clutched position with fingers 196 seated in recesses 198, by a bifurcated member 200 having a pair of arms 202 extending partially around the collar in an annular groove 204 in the periphery of the collar. Bifurcated member 200 is moved bodily to the right and left as viewed in FIGURE 3 by a stem 206 reciprocably mounted in a hole 208 through the housing wall and sealed therein by a gasket 210. Stem 206 is rivited or otherwise securely and rigidly joined at one end to member 200, and contains a fixture 212 at the other end threadedly secured thereto and held in place by a nut 214, fixture 212 being of any suitable design for connecting stem 206 to the control and actuating mechanism. This mechanism may be a solenoid, hydraulic motor or a mechanical linkage connecting the fixture to the operating station on the vehicle and on the platform.

The vehicle is driven in either forward or reverse by the engine 74 under hood 22 or from the engine in housing 34 on the platform. The operator of the vehicle can readily select the engine from which the vehicle is driven by merely operating clutch 190 through fixture 212 and stem 206. When the clutch is moved by the stem to the right, as viewed in FIGURE 3, after engine 74 has been placed in neutral, hydraulic motor 170 drives shaft 128, worm 126, worm gear 120, and through clutch 190, drives shaft 80 and propeller shaft 76 to propel the vehicle. The hydraulic motor is driven by a hydraulic pump which in turn is driven by the engine on the platform and which delivers hydraulic fluid under pressure through flexible tube 216 to the hydraulic motor, the fluid being returned from the hydraulic motor through flexible tube 218. When it is desired to drive the vehicle by engine 74, the operator through his controls from either the platform or the drivers's seat of the vehicle shifts clutch 190 to the position shown in FIGURE 3, thus disengaging fingers 196 from recesses 198, permitting shafts 72, 80 and 76 to rotate freely without interference from worm gear 120 and worm 126.

While only one embodiment of the present invention has been described in detail herein, various changes may be made in the present transmission without departing from the scope of the present invention.

I claim:

1. In an excavator or the like having a boom, an engine for propelling the vehicle thereof, an engine for operating a boom, and a driven vehicle propelling means: a transmission, comprising a housing, a rotatable shaft extending through said housing, a means for connecting one end of said shaft with said first mentioned engine means for connecting the other end of the shaft with said propelling means, bearings in opposed walls of said housing for said shaft, a worm gear journaled on said shaft for relative rotation therewith, a worm for driving said gear, a shaft for said worm journaled in said housing and projecting outwardly therefrom at one end, a hydraulic motor driven from said second mentioned engine, a chain and sprocket connecting said motor with said second mentioned shaft, a clutch including an axially shiftable collar on said first mentioned shaft adjacent said gear, means defining a recess on said gear, a projection on said collar for seating in said recess, a bifurcated member for engaging said collar, and a stem for moving said member.

2. In an excavator or the like having a boom, an engine for propelling the vehicle thereof, an engine for operating a boom, and a driven vehicle propelling means: a transmission, comprising a housing, a rotatable shaft in said housing, a means for connecting one end of said shaft with said first mentioned engine, means for connecting the other end of the shaft with said propelling means, a worm gear journaled on said shaft for relative rotation therewith, a worm for driving said gear, a shaft for said worm, a hydraulic motor driven from said second mentioned engine, a means connecting said motor with said second mentioned shaft, a clutch including an axially shiftable collar on said first mentioned shaft adjacent said gear, opposed disengaging interlocking members on said collar and gear, and a linkage for operating said clutch.

3. In an excavator on the like having a boom, an engine for propelling the vehicle thereof, an engine for operating a boom, and a driven vehicle propelling means: a transmission, comprising a rotatable shaft, a means for connecting one end of said shaft with said first mentioned engine, means for connecting the other end of the shaft with said propelling means, a worm gear journaled on said shaft for relative rotation therewith, a worm for driving said gear, a shaft for said worm, means for connecting said second mentioned shaft with said second mentioned engine, a clutch for connecting said gear with said first mentioned shaft, and a linkage for operating said clutch.

4. A transmission for propelling a vehicle by two engines selectively operated through a driven vehicle propelling means, comprising a housing, a rotatable shaft extending through said housing, a means for connecting one end of said shaft with one of the engines, means for connecting the other end of the shaft with the driven vehicle propelling means, bearings in opposed walls of said housing for said shaft, a worm gear journaled on said shaft for relative rotation therewith, a worm for driving said gear, a shaft for said worm, means for connecting said second mentioned shaft with other engine, a clutch including an axially shiftable collar on said first mentioned shaft adjacent said gear, means defining a recess on said gear, a projection on said collar for seating in said recess, a bifurcated member for engaging said collar, and a stem for moving said member.

5. A transmission for propelling a vehicle by two engines selectively controlled through a driven vehicle propelling means, comprising a housing, a rotatable shaft in said housing, a means for connecting one end of said shaft with one of the engines, means for connecting the other end of the shaft with the vehicle propelling means, bearings in opposed walls of said housing for said shaft, a worm gear journaled on said shaft for relative rotation therewith, a worm for driving said gear, a shaft for said worm, means for connecting said second mentioned shaft with said other engine, a clutch including a axially shiftable collar on said first mentioned shaft adjacent said gear, opposed disengaging interlocking members on said collar and gear, and a linkage for operating said clutch.

6. A transmission for propelling a vehicle by either of two engines selectively through a driven vehicle propelling means, comprising a housing, a rotatable shaft in said housing, a means for connecting one end of said shaft with one of the engines, means for connecting the other end of the shaft with the vehicle propelling means, bearings in opposed walls of said housing for said shaft, a worm gear journaled on said shaft for relative rotation therewith, a worm for driving said gear, a shaft for said worm, means for connecting said second mentioned shaft with said other engine, a clutch for connecting said gear with said first mentioned shaft, and a linkage for operating said clutch.

7. A transmission comprising a housing, a rotatable shaft extending through said housing, means forming a direct drive connection between one end of said shaft and a power source, means forming a direct drive connection between the other end of said shaft and a power driven means, bearings in opposed walls of said housing for said shaft, a worm gear journaled on said shaft for relative rotation therewith, a worm for driving said gear, a shaft for said worm journaled in said housing and projecting outwardly therefrom at one end, means for connecting said second mentioned shaft with another power source, a clutch including an axially shiftable collar on said first mentioned shaft adjacent said gear, means defining a recess on said gear, a projection on said collar for seating in said recess, a bifurcated member for engaging said collar, and a stem for moving said member.

8. A transmission comprising a housing, a rotatable shaft in said housing, means forming a direct drive connection between one end of said shaft and a power source, means forming a direct drive connection between the other end of said shaft and a power driven means, a worm gear journaled on said shaft for relative rotation therewith, a worm for driving said gear, a shaft for said worm journaled in said housing, means for connecting said second mentioned shaft with another power source, a clutch including an axially shiftable collar on said first mentioned shaft adjacent said gear, opposed disengaging interlocking members on said collar and gear, and a linkage for operating said clutch.

References Cited by the Examiner

UNITED STATES PATENTS

| 1,718,223 | 6/29 | Elmendorf et al. | 74—425 X |
| 2,292,690 | 8/42 | Hoge | 74—425 |
| 2,731,097 | 1/56 | Zeilman et al. | |
| 2,923,171 | 2/60 | Zedrzykowski | 74—665.0 |

FOREIGN PATENTS

| 1,024,257 | 1/53 | France. |
| 1,048,168 | 7/53 | France. |

BROUGHTON G. DURHAM, *Primary Examiner.*